3,663,690
MUCOLYTIC COMPOSITION AND METHOD OF TREATMENT OF BRONCHO-PULMONARY DISORDERS THEREWITH
Hermann J. Eichel and Kenneth R. Hickey, Cincinnati, and Frank R. Springman, Cleves, Ohio, assignors to American Hoechst Corporation, Somerville, N.J.
No Drawing. Filed Aug. 12, 1969, Ser. No. 849,487
Int. Cl. A61k 19/00
U.S. Cl. 424—94                    1 Claim

ABSTRACT OF THE DISCLOSURE

Pharmaceutically active compositions for treatment of broncho-pulmonary disorders containing an N-substituted cysteine derivative together with desoxyribonuclease, both of which act as mucolytic agents, each on its respective substrate.

It is known that certain compounds containing free mercapto groups can be used as mucolytic agents in the treatment of pulmmonary disorders. Such compounds lower the viscosity of respiratory mucous secretions by a mechanism involving the cleavage of disulfide linkages of mucoprotein. It is also known that desoxyribonuclease treatment of pulmonary disorders. Such compounds rapidly degrades desoxyribonucleoprotein (and desoxyribonucleic acid), thus decreasing the viscosity of purulent material.

---

The present invention relates to pharmaceutically active compositions wherein the properties of the above-mentioned two mucolytic agents, both of which serve to reduce tenacity and viscosity of secretions in various broncho-pulmonary disorders, are combined, so that they can act simultaneously, each on its respective substrate.

Such pharmaceutically active compositions can be obtained by combining desoxyribonuclease with an N-substituted cysteine derivative of the formula (I) 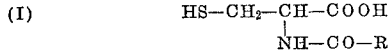

in which R is methyl, ethyl, propyl, isopropyl, butyl, isobutyl, tert-butyl or primary amino.

The activity of said combination is surprising since the enzyme desoxyribonuclease itself is a protein known to contain cystine (the amino acid which provides the disulfide linkages in proteins), U. Lindberg, Biochemistry, vol. 6, pages 335, 342 (1967), it was to be expected that the mercapto compound, which acts on mucoprotein by a disulfide cleavage mechanism, would denature the enzyme in the same manner.

The cysteine derivative may be prepared by conventional methods. For instance, L-α-ureido-β-mercaptopropionic acid (R=NH₂) can be obtained by the method of Schöberl and Hamm, Chemische Berichte, vol. 81, pages 210–214 (1948), whereby L-cystine is converted by hydrogen cyanide to one equivalent each of L-cysteine and the corresponding β-thiocyanate of L-α-aminopropionic acid. Separation of the latter and treatment with a base produces the by-products L-cysteine and cyanic acid which interact to produce L-α-ureido-β-mercaptopropionic acid. Thus, for example, a 4.00 ml. aqueous solution containing 16.2 g. potassium cyanide and 10.0 g. L-cystine is acidified with acetic acid to a pH of 5–6, diluted with water to a volume of 50 ml., neutralized with sodium hydroxide, and treated with lead acetate to produce a yellow precipitate of the lead salt of L-cysteine. The precipitate is washed with water and the filtrate, ascertained not to contain mercaptan by the sodium nitroprusside test, is treated with copper acetate solution to precipitate the copper salt of the thiocyanate derivative of L-cysteine. A hot water solution of the copper salt is treated with hydrogen sulfide to precipitate copper sulfide, the latter is filtered, and the filtrate is concentrated and cooled until crystals of the thiocyanate derivative precipitate. Recrystallization from water affords a 36% yield of the intermediate. 5 g. of the thiocyanate compound is allowed to stand in 10 ml. of a 30% sodium hydroxide solution for 10 hours at 40° C. under a nitrogen atmosphere. After this time the solution is brought just to neutrality, and the L-α-ureido-β-mercaptopropionic acid is extracted with ether, the ether solution is concentrated, and the crystals are collected.

A general method for syntheses of the L-N-acylcystein analogs (in which R is alkyl) is exemplified by the following procedure described in U.S. Patent No. 3,091,569. To 35 g. (0.2 mol) L-cysteine hydrochloride monohydrate in 100 ml. 4 N sodium hydroxide at 0° C. is added, with stirring under a nitrogen atmosphere and over a two hour period, 0.2 mol of the appropriate acyl chloride and 60 ml. 4 N sodium hydroxide. The mixture is stirred another few hours, then stored overnight in a refrigerator. The mixture is then acidified with 6 N hydrochloric acid and concentrated under reduced pressure at room temperature. Ethanol is added and the mixture is filtered to remove insoluble salts. The filtrate is concentrated to an oil. An aqueous solution of the oil is chromatographed on a Dowex 50–X8 (200–40 mesh) column. The elution fraction demonstrating a positive nitroprusside test is collected. The eluate is then concentrated, and the resulting residue is crystallized from an appropriate solvent.

Desoxyribonuclease, the other component of the combination, is an enzyme which can be derived from various animal organs, such as beef pancreas, as is well known in the art. The viscosity-lowering or mucolytic activity of L-α-ureido-β-mercaptopropionic acid (UMA) and desoxyribonuclease (DNase) from beef pancreas was tested in vitro individually and in combination on a standard mucoprotein (MP) [prepared by the method of Sheffner, Annals of the New York Academy of Sciences, vol. 106, pages 298–310 (1963)] solution on a 0.1% desoxyribonucleic acid (DNA) solution, and on a solution consisting of seven volumes of the MP solution and three volumes of the DNA solution.

A Wells-Brookfield micro cone-plate viscometer, Model LVT, was used for the determination of absolute viscosity in centipoises (cps.) by procedures similar to those discussed by Rand et al., Journal Appl. Physiol., vol. 19, page 117 (1964), for blood. The enzyme DNase was tested in the form of a saline solution having a concentration of 100,000 units per ml. The compound UMA was tested as a 20% solution in water with the pH adjusted to 7.8 with sodium hydroxide. The DNA was used as a 0.1% saline solution (viscosity of 8.0 cps.).

A control solution consisted of 0.1 ml. of DNase solution (10,000 units) in 1.0 ml. of saline solution. The experimental solution consisted of 1.0 ml. of 20% UMA saline solution and 0.1 ml. of DNase (10,000 units). The respective solutions were tested immediately, then allowed to stand at room temperature and tested after one hour and after 20 hours for comparative effects on the viscosity-reductions of the DNA solution. A sample of 0.1 ml. of the mixture (1,000 units of DNase) was added to 1.3 ml. of the DNA solution. Preliminary experiments revealed that this concentration elicited a moderate rate of decrease of viscosity that was easily measured over a thirty minute period of time. Viscosity readings were taken at a rate of shear of thirty revolutions per minute. Other previous experiments had also shown UMA, in 0.05 mol concentration, to decrease the absolute viscosity of standard MP solution by 17.9±0.9% in 60 minutes.

The results of the experiments, which were designated to measure the inhibition by UMA of the proteolytic activity of DNase, are as follows:

DNase (1,000 units) alone reduces the viscosity of the DNA solution from 8 cps. to 2–3 cps. or less within 20–30 minutes. The experimental solution and the control solution showed comparable activities after incubating for up to 20 hours. The compound UMA showed no significant effect in reducing the viscosity of a DNA solution. DNase showed only a very slight effect (3 to 5%) in reducing the viscosity of the MP solution.

In another experiment it was shown that DNase does not interfere with the mucolytic activity of UMA on an MP solution.

Further experiments were carried out to measure the viscosity-lowering effect of the mucolytic combination UMA/DNase on the substrate combination MP/DNA. The results of these experiments are summarized in the following table:

TABLE

| Agent: | Viscosity reduction (percent) MP+DNA (7:3) |
|---|---|
| (I) DNase (10,000 units) | 42 |
| (II) UMA (1 ml. 20% solution) | 11 |
| (III) I plus II | 55 |

These data show that the viscosity-lowering activities of the two agents in combination are additive, i.e., the sum of the activity of DNase on the substrate combination (42%) and of UMA on the substrate combination (11%) is 53%. This sum compares well with the activity of the mucolytic combination on the substrate combination (55%). Even after 20 hours incubation at room temperature, there was still no mercaptan-induced denaturation of the enzyme.

The composition of the present invention is suitable for use in the treatment of broncho pulmonary disorders involving congestion of the respiratory passages with mucus and other purulent material. Administration may be accomplished by direct inhalation by the use of conventional nebulizers.

In accordance with the preferred embodiment of the invention, the composition is an aqueous solution consisting essentially of, per 10 ml. of solution, 1 to 2 gm. crystalline mercaptan compound of Formula I;
50,000 to 100,00 units of freeze-dried desoxyribonuclease;
A buffer salt such as for example, potassium dihydrogen phosphate-disodium hydrogen phosphate in an amount sufficient and proportion necessary to impart a pH of about 7.1 to 7.8, preferably about 7.5 to the solution;
A stabilizer, such as $CaCl_2$, in sufficient amount to impart stability to desoxyribonuclease at said pH; and
Sterile normal saline solution q.s. ad 10 ml.

The relative proportions of crystalline mercaptan compound of Formula I to desoxyribonuclease set forth above are such as to produce an enzyme activity of 10,000 to 100,000 units per 10 ml. of solution.

Example 1

2 g. L-α-ureido-β-mercaptopropionic acid and 100,000 units freeze-dried desoxyribonuclease together with above described buffer salt and stabilizer are dissolved in 10 ml. sterile normal saline solution.

Example 2

2 g. L-α-ureido-β-mercaptopropionic acid and 50,000 units freeze-dried desoxyribonuclease together with above described buffer salts and stabilizer are dissolved in 10 ml. sterile normal saline solution.

Example 3

2 g. N-acetyl-L-cystein and 100,000 units freeze-dried desoxyribonuclease together with above-described buffer salt and stabilizer are dissolved in 10 ml. sterile normal saline solution.

Example 4

2 g. N-acetyl-L-cysteine and 50,000 units freeze-dried desoxyribonuclease together with above-described salt and stabilizer are dissolved in 10 ml. sterile normal saline solution.

We claim:

1. A mucolytic composition consisting essentially of a sterile normal saline solution buffered at a pH of about 7.1 to 7.8 and, per 10 milliliters of said solution, 1 to 2 grams of L-α-ureido-β-mercaptopropionic acid; 50,000 to 100,000 units of desoxyribonuclease; and calcium chloride as a stabilizer for said desoxyribonuclease.

References Cited

UNITED STATES PATENTS

| 3,042,587 | 7/1962 | Baumgarten et al. | 424—94 X |
| 3,091,569 | 5/1963 | Sheffner | 424—319 X |

FOREIGN PATENTS

| 5,513M | 6/1967 | France | 424—319 |
| 1,098,758 | 1/1968 | Great Britain | 424—319 |

OTHER REFERENCES

The United States Dispensatory, 26th edition, 1965, pp. 9–10, 800–801.

Chemische Berichte, vol. 81, pp. 210–214.

ALBERT T. MEYERS, Primary Examiner

N. A. DREZIN, Assistant Examiner

U.S. Cl. X.R.

424—319